Oct. 2, 1928.
S. E. MEYERS
1,686,336
PLUG VALVE
Filed Sept. 23, 1925   2 Sheets-Sheet 1
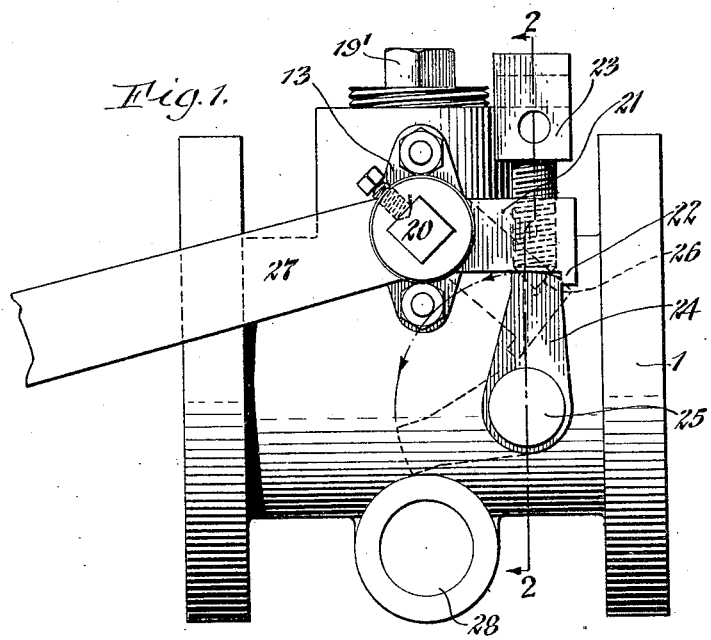
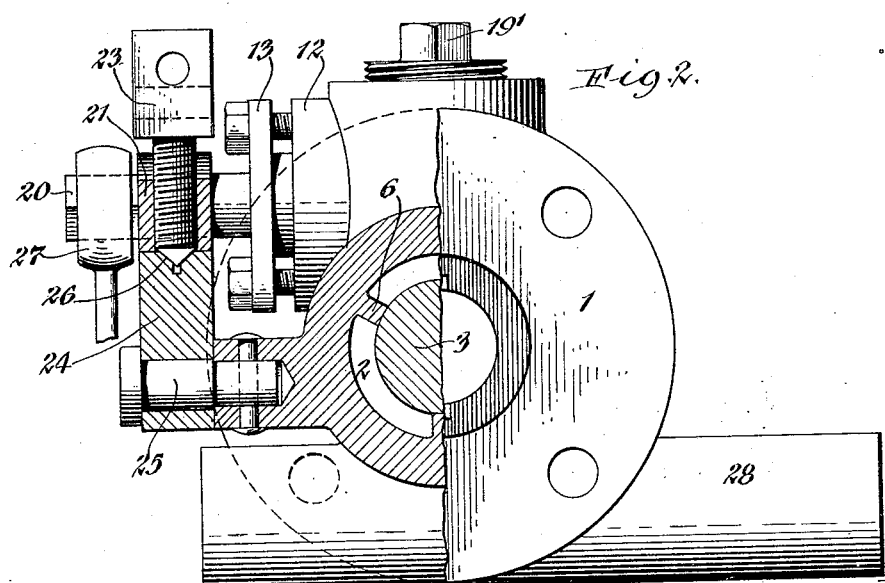
Inventor
S.E. MEYERS.
by William J. Warslake
Attorney

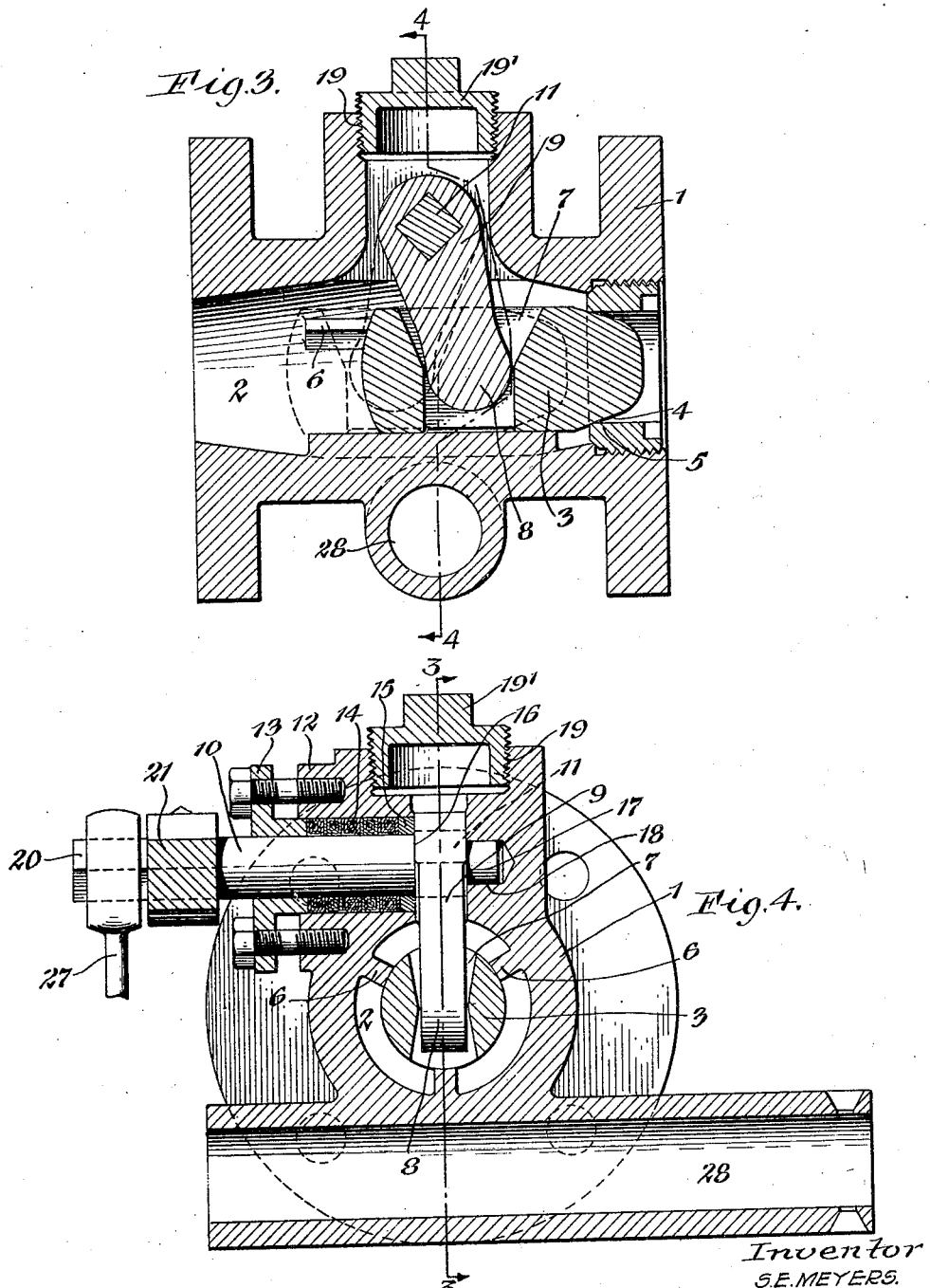

Patented Oct. 2, 1928.

1,686,336

UNITED STATES PATENT OFFICE.

SIDNEY E. MEYERS, OF BUFFALO, NEW YORK, ASSIGNOR TO NATIONAL ANILINE & CHEMICAL CO., INC., OF NEW YORK, N. Y., A CORPORATION OF NEW YORK.

PLUG VALVE.

Application filed September 23, 1925. Serial No. 58,058.

This invention relates to valves and specifically to valves of the plug type.

It is an object of this invention to provide a valve that is suitable for high temperature liquids or molten solids. Another object is a valve that has a minimum of internal moving parts. A further object is a valve having small frictional contact surface. In addition this invention contemplates means for forcing the plug to its seat and for securely retaining the plug in its closed position. These and other objects will appear hereinafter.

An embodiment for the accomplishment of these objects consists of an annular body having pipe connections at either end. In one end is a valve seat, and a plug, sliding within the body on spaced ribs, cooperates with the seat. For reciprocating the plug a pivoted lever extends into it and its pivot stem extends outside the body for operating it. The plug can be forced and held to its seat by an arm secured to the stem and supported on a pivoted stop, against the end of which a screw in the arm is applied.

In the drawing which illustrates the embodiment selected for disclosing this invention, Fig. 1 is an elevation;

Fig. 2 is a partial section on the line 2—2 of Fig. 1;

Fig. 3 is a section on the line 3—3 of Fig. 4; and

Fig. 4 is a section on the line 4—4 of Fig. 3.

A valve body 1 has an approximately cylindrical channel 2 throughout its entire length, in which channel a valve plug 3 reciprocates. The plug has a blunt conical or tapered end 4 to coact with a valve seat 5 removably mounted in one end of the channel; but the valve seat may be made integral with the body if desired.

Ribs 6, serve as guides for the plug, and space it from the wall to maintain an axial alignment between the plug and the seat. The ribs extending longitudinally of the channel present but a slight area transverse of the channel and have substantially line contact with the plug, thus reducing interference with flow through the valve body and frictional contact surfaces to a minimum. The ribs are shown attached to the wall, but they can form part of the plug if desired.

The plug is slotted at 7 to receive the free end 8 of a lever 9 which is carried upon a shaft or stem 10. The lever 9 is rectangular in cross section with a relatively thin edge surface in the longitudinal direction of the channel to reduce impedance to flow through the channel to a minimum; the viscous nature of the materials for which the valve is primarily designed, however, demands a rugged construction capable of transmitting the forces that may be required, and for such use an appreciable thickness of the lever becomes imperative. The stem is given a square section 11 in the portion in contact with the lever 9 to obviate the need of a key or set screw.

As shown in Fig. 4, the stem extends exteriorly of the body through a stuffing box 12, having a gland 13 and a packing 14, and a bushing ring 15 is inserted between the packing and the lever to contact with a shoulder 16 formed on the lever. The interior end 17 of the stem is journaled in a hole 18 formed in the body. The stem is thus supported on both sides of the lever. In order that these parts may be assembled an opening 19 is formed in the valve body through which the lever 9 is inserted and the stem 10 can then be passed through the lever; a plug 19' closes the opening 19.

On the externally projecting end 20 of the stem 10, which is of square cross section, is secured an arm or member 21. The arm has a lip or hooked end 22, and it is tapped to receive a screw 23. A pawl or stop 24, which is free to rotate on a pin 25 carried by the body, is mounted to rotate in the same plane as the arm 21, and has a conical seat 26 into which the end of the screw 23 projects, when they are brought into operative relation as shown by full lines in Fig. 2.

As shown the pressure of the screw upon the stop is in a line offset from the center about which the stop rotates. Consequently there is a small turning moment applied to the pawl in that direction. This is counteracted by the engagement of the pawl and the hooked end 22 on the arm 21. The lip 22 therefore acts as a limit to the movement of the pawl, and in addition as an abutment to take up the thrust caused by the offset application of the force. With this offset construction, there is no danger of accidental release of the plug when it is secured in closed position.

The end 20 of the shaft is sufficiently long to receive a demountable wrench 27 for turning it and operating the plug. The body may also be provided with a tubular extension 28 for the reception of an electrical heating unit or other heating means for heating the valve during the passage of material that tends to solidify; the heater, however, forms no part of the present invention.

In operation, a wrench 27 is applied to the stem 10. If the screw 23 has been turned into its seat 26 on the pawl 24, the two elements 21 and 24 are disengaged by withdrawing the screw from its seat, and the pawl is turned into its lowered position as shown in dotted lines on Fig. 1. The arm 21 is then free to turn as shown in dotted lines on Fig. 1 and turning of the stem carrying the arm 21 reciprocates the plug.

Throwing the pawl upwardly into contact with the arm 21 and turning the screw 23 on its seat 26 gives a powerful leverage to force the plug against its seat. Accordingly the screw acts as a power multiplying means, for closing the valve, and it also locks the plug and holds it in closed position on its seat.

The blunt conical end given the plug provides a minimum contacting surface with the seat, as there is substantially only a line contact between them and consequently but very little area for adherence. In addition, the taper of the plug provides a tight contact with the seat irrespective of temperatures and other changes, for it provides for variations in dimensions due to such changes.

The ribbed channel construction permits flow of material about the plug, and it also reduces to a minimum the sliding contact surfaces. Accordingly there is but little frictional area or wearing surface that is liable to coating and clogging by the material controlled by the valve. Furthermore as the flow of material is in one direction through the valve body, a minimum of resistance is imposed, and the valve therefore is adapted for materials in molten or viscous condition.

I claim:

1. A valve comprising in combination a hollow body, a seat in said body, a tapered plug slidably mounted in spaced relation in said body and cooperating in axial alignment with said seat, said plug having a slot, a lever extending into said slot, an exteriorly extending rotatable stem mounted in said body on which said lever is secured, means for rotating said stem, an arm secured to said stem and rotatable therewith, said arm having a downwardly extending lip at its outer end, an adjustable screw extending through said arm, and a pawl pivotedly mounted exteriorly on said hollow body in a line offset from the vertical axis of said adjustable screw and adapted to be projected into the path of said arm and abutted against the downwardly extending lip thereon, said pawl having in its end a conical seat for engaging endwise said adjustable screw and coacting therewith whereby said plug can be forced and positively secured on its seat.

2. A valve comprising in combination a hollow body having a seat and a closure therefor, means for reciprocating said closure with relation to said seat, an exterior rotatable arm associated with said reciprocating means and provided with a downwardly extending hook or lip at its outer end, an adjustable screw extending through said arm, and a manually operable pawl projectable into the path of said arm and so mounted that it can be brought into engagement with said adjustable screw and eccentrically coact therewith.

3. A valve comprising in combination a hollow body, a closure and seat therefor within said body, means for operating said closure, a rotatable member associated with said operating means, a member projectable into the path of said rotatable member, and adjustable means on said rotatable member for engaging said projectable member, said adjustable means coacting in eccentric relationship with said projectable member.

4. A valve comprising in combination a hollow body, a closure and a seat therefor within said body, means for operating said closure, a rotatable member associated with said operating means, a pawl projectable into the path of said rotatable member, an extension on said rotatable member for restraining movement of said pawl, and adjustable means on said rotatable member for engaging said pawl, said pawl being pivoted on said hollow body in eccentric relationship with said adjustable means.

5. A valve comprising in combination a body having a substantially cylindrical channel extending the length of the body with an inlet at one end and an outlet at the other end of the channel, a plug valve slidable within the channel spaced from the wall thereof and having a slot therein, ribs for guiding said valve within the channel, said ribs having substantially line contact longitudinally of the channel, and means for reciprocating said plug including a lever extending within said channel and slot and means without the channel for operating said lever.

6. A valve comprising in combination a body having a substantially cylindrical channel extending the length of the body with an inlet at one end and an outlet at the other end of the channel, longitudinal ribs projecting from the wall of the channel, a plug slidable on said ribs and having substantially line contact therewith, said plug having a slot, a lever extending within said channel and slot, said lever presenting a relatively thin edge surface transversely of the channel, and means without the channel for operating said lever.

7. A valve comprising in combination a hollow body, a seat in said body, a plug slidably mounted in spaced relation in said body and cooperating in axial alignment with said seat, said plug having a slot, a lever extending into said slot, an exteriorly extending rotatable stem mounted in said body on which said lever is secured, means for rotating said stem, an arm secured to the exteriorly extending portion of said stem and rotatable therewith, a pawl pivotedly mounted exteriorly on said hollow body and adapted to engage said arm, whereby rotation of said stem is prevented.

8. A valve comprising in combination a hollow body, a seat in said body, a plug slidably mounted in spaced relation in said body and cooperating in axial alignment with said seat, said plug having a slot, a lever extending into said slot, an exteriorly extending rotatable stem mounted in said body on which said lever is secured, means for rotating said stem, an arm secured to the exteriorly extending portion of said stem and rotatable therewith, a pawl pivotally mounted exteriorly on said hollow body in the plane of rotation of said arm, and adapted to cooperate with said arm to prevent rotation of said stem.

9. A valve comprising in combination a hollow body, a seat in said body, a plug slidably mounted in spaced relation in said body and cooperating in axial alignment with said seat, said plug having a slot, a lever extending into said slot, an exteriorly extending rotatable stem mounted in said body on which said lever is secured, means for rotating said stem, an arm secured to the exteriorly extending portion of said stem and rotatable therewith, a pawl pivotedly mounted exteriorly on said hollow body, and adjustable means on said arm cooperating with said pawl for forcing and securing said plug against said seat.

10. A valve comprising in combination a hollow body, a closure and seat therefor within said body, means for operating said closure, a rotatable member associated with said operating means, a member mounted in the plane of rotation of said rotatable member and projectable into the path of said rotatable member, and adjustable means on said rotatable member for engaging said projectable member, said adjustable means coacting in eccentric relationship with said projectable member.

11. A valve comprising in combination a body having a substantially cylindrical channel extending the length of the body with an inlet at one end and an outlet at the other end of the channel, longitudinal ribs projecting from the wall of the channel, a seat in said body, a plug slidable on said ribs and having substantially line contact therewith, said plug having a slot, a lever extending into said slot, an exteriorly extending rotatable stem mounted in said body on which said lever is secured, means for rotating said stem, an arm secured to the exteriorly extending portion of said stem and rotatable therewith, a pawl pivotedly mounted exteriorly on said hollow body and adapted to engage said arm, and adjustable means on said arm cooperating with said pawl for forcing and securing said plug against said seat.

12. A valve comprising in combination a body having a substantially cylindrical channel extending the length of the body with an inlet at one end and an outlet at the other end of the channel, longitudinal ribs projecting from the wall of the channel, a seat in said body, a plug slidable on said ribs and having substantially line contact therewith, said plug having a slot, a lever extending into said slot, an exteriorly extending rotatable stem mounted in said body on which said lever is secured, means for rotating said stem, an arm secured to said stem and rotatable therewith, said arm having a downwardly extending lip at its outer end, an adjustable screw extending through said arm, and a pawl pivotedly mounted in the plane of rotation of said arm in a line off-set from the vertical axis of said adjustable screw and adapted to be projected into the path of said arm and abutted against the downwardly extending lip thereof, said pawl having in its end a conical seat for engaging endwise said adjustable screw and coacting therewith whereby said plug can be forced and positively secured on its seat.

In testimony whereof I affix my signature.

SIDNEY E. MEYERS.